United States Patent
Anzai et al.

(10) Patent No.: US 8,056,804 B2
(45) Date of Patent: Nov. 15, 2011

(54) READER/WRITER DEVICE FOR NONCONTACT IC CARD, COMMUNICATION SYSTEM AND NONCONTACT COMMUNICATION METHOD

(75) Inventors: Jun Anzai, Kanagawa (JP); Yasuhide Horiuchi, Kanagawa (JP); Katsuhiko Tando, Kanagawa (JP)

(73) Assignee: Panasonic Corporation, Osaka (JP)

(*) Notice: Subject to any disclaimer, the term of this patent is extended or adjusted under 35 U.S.C. 154(b) by 239 days.

(21) Appl. No.: 12/514,772

(22) PCT Filed: Nov. 14, 2006

(86) PCT No.: PCT/JP2006/322669
§ 371 (c)(1),
(2), (4) Date: May 29, 2009

(87) PCT Pub. No.: WO2008/059564
PCT Pub. Date: May 22, 2008

(65) Prior Publication Data
US 2010/0059590 A1 Mar. 11, 2010

(51) Int. Cl.
*G06K 7/00* (2006.01)
(52) U.S. Cl. .................. 235/439; 235/451
(58) Field of Classification Search .......... 235/439, 235/380, 451, 492, 375
See application file for complete search history.

(56) References Cited

U.S. PATENT DOCUMENTS
7,873,853 B2 * 1/2011 Muraoka ............ 713/340
2007/0069687 A1 * 3/2007 Suzuki ............ 320/108

FOREIGN PATENT DOCUMENTS
| JP | 10-004639 | 1/1998 |
| JP | 2984643 | 8/1999 |
| JP | 2003-006592 | 1/2003 |
| JP | 2006-217704 | 8/2006 |
| JP | 2006-243779 | 9/2006 |

* cited by examiner

*Primary Examiner* — Edwyn Labaze
(74) *Attorney, Agent, or Firm* — Dickinson Wright PLLC

(57) ABSTRACT

A reader/writer device performs noncontact communication with a noncontact IC card section (400) to which power is supplied from a power storage section (310) of a portable terminal (300) whereupon the card section is mounted. In the reader/writer device (100), a noncontact communication section (110) transmits and receives information to and from the IC card section (400) by noncontact communication, and a noncontact charging section (120) supplies power to the power storage section (310) in noncontact manner. When noncontact communication with the IC card section (400) cannot be performed by controlling the noncontact communication section (110), a contactless communication/charging control section (130) controls the noncontact charging section (120) to charge the power storage section (310) of the portable terminal (300) in noncontact manner, then, controls the noncontact communication section (110) again to perform noncontact communication.

7 Claims, 2 Drawing Sheets

READER/WRITER DEVICE FOR NONCONTACT IC CARD, COMMUNICATION SYSTEM AND NONCONTACT COMMUNICATION METHOD

TECHNICAL FIELD

The present invention relates to a contactless type IC card reader/writer apparatus that carries out contactless communication with a contactless type IC card mounted on portable type electronic devices, a communication system provided therewith and a contactless communication method.

BACKGROUND ART

In recent years, magnetic cards such as credit cards and prepaid cards are being replaced by IC (integrated circuit) cards incorporating electronic money and capable of providing a plurality of services with a single card, in order to handle a large volume of information and provide card services requiring safety and reliability.

IC cards incorporate an IC chip such as a CPU and IC memory, provide a high level of security, have an arithmetic processing function and can execute processing such as comparison and judgment within the cards. This allows more sophisticated methods of use than magnetic cards to be conceived and new services are being developed in a variety of business fields such as means of transportation, business transactions and security.

IC cards can be roughly classified into a "contact type" in which metal ports of an IC chip are exposed on the card surface and a "contactless type" which carries out communication using electromagnetic wave. Contactless type IC cards can be classified into a "close coupled type," "proximate type," "vicinity type" and "microwave type" depending on the communication distance between the contactless type IC card itself and a reader/writer capable of reading and writing data from and into the IC card.

Such a contactless type IC card superimposes information on electromagnetic wave which is a carrier wave, sends and receives information to and from the reader/writer, and electromagnetic induction type IC cards using a carrier frequency of 13.56 MHz in particular are attracting attention in applications such as electronic tickets, electronic money, access management, amusement, administration, public cards. Furthermore, vicinity type IC cards which are based on an electromagnetic induction scheme using the same frequency are also receiving attention in applications such as room access management and amusement.

These proximate type or vicinity type contactless IC cards do not incorporate any battery and cause an IC inside the card to operate and send responses using power supplied from a reader/writer by electromagnetic induction. Furthermore, when this contactless type IC card is incorporated in a mobile phone, that is, in the case of a contactless IC card (contactless IC) built in a portable terminal, the built-in contactless type IC card generally operates on power supplied from the portable terminal itself.

A service for omitting ticket issuing operation or the like is known, which is delivered to such a contactless type IC card mounted in a portable terminal by contactless communication with a reader/writer apparatus capable of contactless communication provided in an automatic turnstile. The IC function mounted in a mobile phone generally includes both contact and contactless interfaces.

Patent Document 1 discloses a technique of providing a battery charging coil in the phone body so that when power in a secondary battery of a mobile phone is consumed, for example, a charging section which is an outside device performs charging targeted at the coil without contact or Patent Document 2 discloses a technique of receiving communication wave between a mobile phone and a base station using a charging antenna mounted in the mobile phone and realizing charging without contact.

However, such a configuration with a contactless type IC card mounted in a mobile phone that secures power in this way even cannot use the contactless type IC card when the battery of the mobile phone dies.

To be more specific, when the battery of the mobile phone dies while receiving a service using the contactless type IC card, it is no longer possible to report an end of service delivery using the contactless type IC card.

On the other hand, Patent Document 3 discloses a technique of providing a secondary battery in a contactless type IC card itself, securing power through communication with a reader/writer having contactless communication capability or using electromagnetic wave emitted from a mobile phone so as to charge the secondary battery of the contactless type IC card itself.

Patent Document 1: Japanese Patent Application Laid-Open No. 10-4639
Patent Document 2: Japanese Patent No. 2984643
Patent Document 3: Japanese Patent Application Laid-Open No. 2003-6592

DISCLOSURE OF INVENTION

Problems to be Solved by the Invention

However, although Patent Document 3 discloses a configuration in which contactless communication is performed and a secondary battery of the card itself can be charged on the reader/writer side, there is a problem with this configuration of Patent Document 3 that contactless communication and power supply are always performed simultaneously and therefore increase current consumption.

Furthermore, as described above, generally, in a mobile phone mounting a contactless type IC card, the contactless type IC card does not have a power source inside and operates on power supplied from a secondary battery of the mobile phone.

Thus, there is a demand for such a reader/writer that can communicate in a contactless manner with a contactless type IC card mounted in a mobile phone without a built-in secondary battery, even when the battery of the mobile phone dies.

That is, unlike Patent Document 3, there is a demand for a reader/writer that not only carries out contactless communication with an active contactless type IC card mounted on a mobile phone, but that also supplies power to allow the contactless type IC card to operate, in the same way as a passive contactless type IC card.

It is therefore an object of the present invention to provide a contactless type IC card reader/writer apparatus that, even when the battery of a mobile phone mounting a contactless type IC card without a built-in power source dies, enables contactless communication with the contactless type IC card with reduced power consumption, a communication system with this reader/writer apparatus, and a contactless communication method.

Means for Solving the Problem

The reader/writer apparatus of the present invention is a contactless type IC card reader/writer apparatus that carries out contactless communication with a contactless type IC card, the contactless type integrated circuit card not having a built-in power source and receiving a supply of power from a power storage section in a portable terminal in which the contactless type IC card is mounted, and this reader/writer apparatus adopts a configuration including: a contactless communication section that sends and receives information to and from the contactless type IC card by contactless communication; a contactless charging section that supplies power to the power storage section in the portable terminal in a contactless manner; a detection section that detects the state of contactless communication; and a control section that controls switching between the contactless communication section and the contactless charging section based on the detection result in the detection section to select between sending and receiving information by the contactless communication, and supplying power in a contactless manner, and, in this reader/writer apparatus, when contactless communication with the contactless type IC card using the contactless communication section is not possible, the control section controls the contactless charging section to charge the power storage section in the portable terminal a certain period of time and then controls the contactless communication section again to carry out contactless communication.

The communication system of the present invention is a communication system including a portable terminal mounting a contactless type IC card that does not have a built-in power source, and a contactless type integrated circuit card reader/writer apparatus that carries out contactless communication with the contactless type integrated circuit card, the portable terminal comprising a power storage section, which is a power source of the portable terminal and supplies power to the contactless type IC card, the reader/writer apparatus including: a contactless communication section that sends and receives information to and from the contactless type IC card by contactless communication; a contactless charging section that supplies power to the power storage section in the portable terminal in a contactless manner; a detection section that detects the state of contactless communication; and a control section that controls switching between the contactless communication section and the contactless charging section based on the detection result in the detection section to select between sending and receiving information by the contactless communication and supplying power in a contactless manner, and in this communication system, when contactless communication with the contactless type IC card using the contactless communication section is not possible, the control section controls the contactless charging section to charge the power storage section in the portable terminal a certain period of time and then controls the contactless communication section again to carry out contactless communication.

The contactless communication method of the present invention is a contactless communication method for carrying out contactless communication with a contactless type IC card that does not have a built-in power source and receives a supply of power from a power storage section in a portable terminal in which the contactless type IC card is mounted, the contactless communication method including: a contactless communication step sending and receiving information to and from the contactless type IC card by contactless communication, a contactless charging step of stopping the contactless communication when contactless communication is not possible and supplying power to the power storage section in the portable terminal in a contactless manner and carrying out contactless communication again after performing the contactless power supply a certain period of time.

Advantageous Effect of the Invention

With the present invention, even when the battery of a mobile phone mounting a contactless type IC card without a built-in power source dies, it is possible to carry out contactless communication with the contactless type IC card with reduced power consumption.

BEST MODE FOR CARRYING OUT THE INVENTION

Hereinafter, an embodiment of the present invention will be explained in detail with reference to the accompanying drawings.

Figure 1:
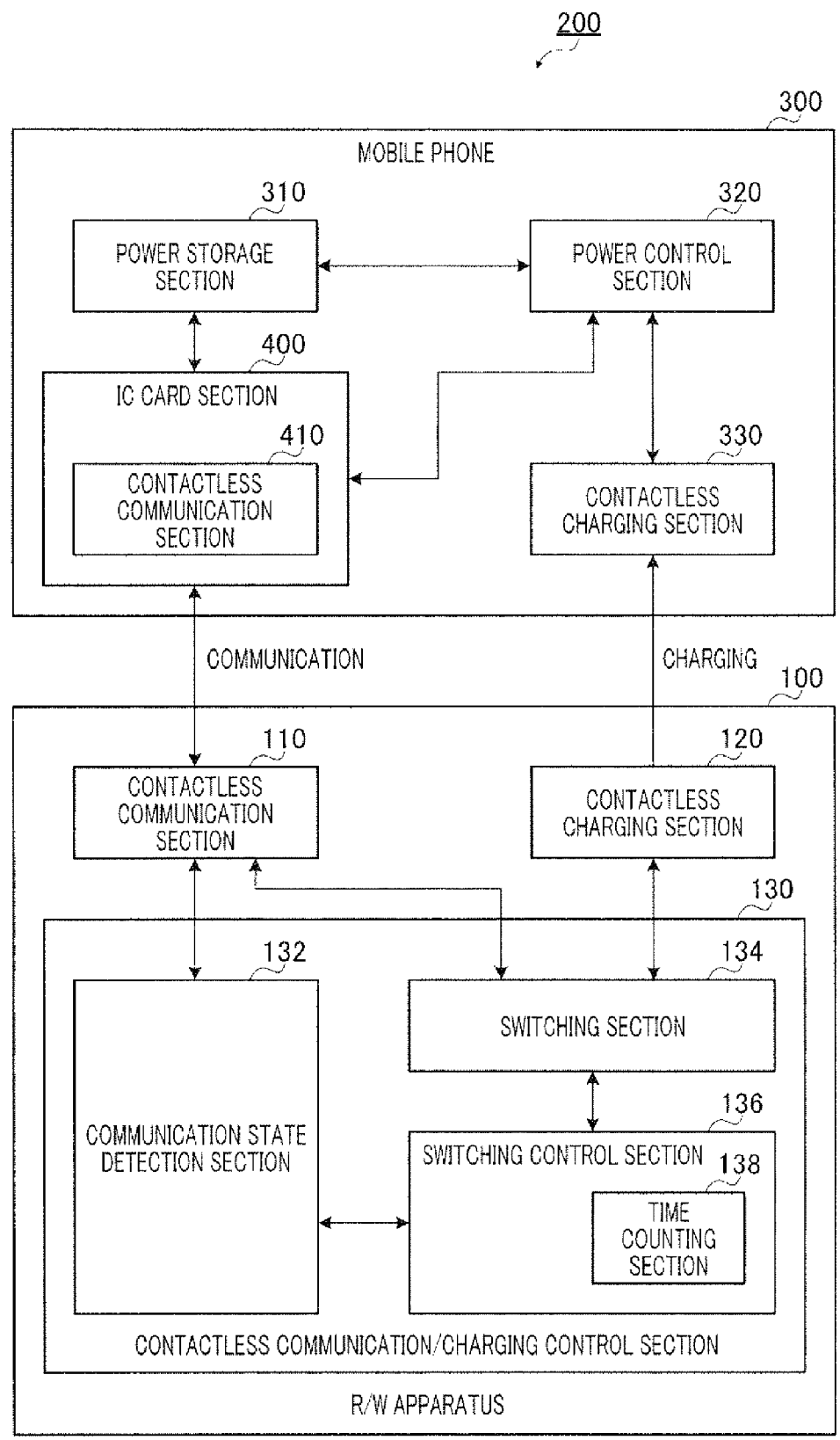
FIG. 1 is a block diagram showing a schematic configuration of a communication system provided with a reader/writer apparatus according to an embodiment of the present invention.

FIG. 1 is a block diagram showing a schematic configuration of communication system 200 provided with reader/writer apparatus 100 ("R/W apparatus" in FIG. 1) according to an embodiment of the present invention.

In communication system 200 shown in FIG. 1, reader/writer apparatus 100 carries out contactless communication with contactless type IC card (hereinafter, "IC card section") 400 mounted in mobile phone 300 as a portable terminal, and also supplies power to allow IC card section 400 to carry out contactless communication operation via mobile phone 300.

The contactless type IC card incorporates an IC chip provided with a non-volatile memory having a secure region and an antenna, and also includes those not in a card shape, for example, RFID (Radio Frequency Identification).

In this system 200, contactless communication between reader/writer apparatus 100 and IC card section 400 is carried out as symmetric communication using, for example, a 13.56-MHz frequency band without using subcarriers.

First, mobile phone 300 mounted with contactless type IC card ("IC card section") 400 as a portable terminal will be explained.

By incorporating a contactless type IC card as IC card section 400, mobile phone 300 is provided with an IC function in addition to a conversation function.

IC card section 400 incorporates a non-volatile memory and a radio communication chip, and can exchange data such as settlement of fees by only holding IC card section 400 over reader/writer apparatus 100.

Mobile phone 300 provided with IC card section 400 provides a variety of functions using the conversation function and the function of IC card section 400 such as prepaid type electronic money, electronic coupon, credit card function so that the mobile phone can be used as a substitute for a wallet.

Mobile phone 300 has the IC function by mounting a contactless type IC card as IC card section 400 and is provided with power storage section 310 which serves as a power source of mobile phone 300, power control section 320 and contactless charging section 330.

IC card section 400 incorporates no power source and is provided with contactless communication section 410 that carries out contactless communication with reader/writer apparatus 100 using power supplied from power storage section 310 of mobile phone 300 as a power source.

This contactless communication section 410 is provided with an antenna for receiving a signal from an antenna of contactless communication section 110 by making IC card section 400 to come close to contactless communication section 110 of reader/writer apparatus 100, and carries out contactless communication with contactless communication section 110 using this antenna. For example, through transmission and reception of signals to and from contactless communication section 110 of reader/writer apparatus 100 by contactless communication section 410, IC card section 400 carries out mutual authentication with reader/writer apparatus 400 and reads and writes data.

Power storage section 310 is a capacitor such as a secondary battery or condenser. When power storage section 310 is a secondary battery, it is preferable to use a high capacity type power storage section such as lithium ion battery and nickel hydrogen battery, but it is equally possible to use a lithium polymer battery using gel polymer or inorganic solid electrolyte for the electrolyte, all-solid electrolyte battery, lead storage battery nickel cadmium battery and so on.

On the other hand, when power storage section 310 is a capacitor, the capacitor is an immediately chargeable or dischargeable medium. For this reason, when power is supplied from the capacitor as power storage section 310 to IC card section 400 having a contactless IC function, compared to the case where power storage section 310 is a secondary battery, a lapse of a certain period of time is not required to charge the secondary battery, and it is possible to charge in a shorter time than the certain period of time and discharge immediately. That is, the use of a capacitor for power storage section 310 makes it possible to supply power to IC card section 400 virtually in parallel with charging and start contactless communication.

By the way, this configuration may be acquired in advance by switching control section 136 on the reader/writer apparatus 100 side or may be reported to the reader/writer apparatus 100 side during contactless communication by mobile phone 300. In the present embodiment, power storage section 310 will be explained as the secondary battery.

This power storage section 310 is a power source for mobile phone 300 itself, supplies power to IC card section 400 mounted in mobile phone 300 and serves as a power source for IC card section 400, and power control section 320 controls charging and discharging.

Power control section 320 controls charging and discharging of power stored in power storage section 310. To be more specific, power control section 320 charges power storage section 310 using power supplied via contactless charging section 330.

Furthermore, power control section 320 controls the power charged in power storage section 310 to be supplied to each component of mobile phone 300 itself and also controls the power to supply to IC card section 400.

When coming close contactless charging section 120 of reader/writer apparatus 100, contactless charging section 330 acquires power via contactless charging section 120.

For example, contactless charging section 330 has an antenna coil (not shown) for receiving electromagnetic wave transmitted from an antenna coil (not shown) provided in contactless charging section 120 of reader/writer apparatus 100 and a converter (not shown) for converting power (AC) generated in the antenna coil to a direct current. The direct current outputted from this converter is supplied to power storage section 310 via power control section 320, thereby charging power storage section 310.

That is, mobile phone 300 mounting the contactless type IC card as IC card section 400 carries out contactless communication with reader/writer apparatus 100 and also receives power to operate IC card section 400 supplied from reader/writer apparatus 100.

Reader/writer apparatus 100 has contactless communication section 110, contactless charging section 120 and contactless communication/charging control section 130 that controls contactless communication section 110 and contactless charging section 120.

Suppose this reader/writer apparatus 100 is applied to an automatic turnstile (ticket checking apparatus) here and the payment procedure can be performed by simply holding the mobile phone mounting the contactless type IC card over a predetermined location of reader/writer apparatus 100. Reader/writer apparatus 100 may also be applied as a reader/writer apparatus for a personal computer or applied to a POS (Point Of Sales) apparatus using prepaid type electronic money.

When IC card section 400 mounted in mobile phone 300 comes close, contactless communication section 110 transmits and receives information to and from contactless communication section 410 of IC card section 400 by contactless communication.

When contactless charging section 330 of mobile phone 300 comes close, contactless charging section 120 supplies power to contactless charging section 330 without contacting contactless charging section 330.

Contactless charging section 120 has an antenna coil (not shown) for transmitting electromagnetic wave and power is supplied to power storage section 310 when electromagnetic wave transmitted from this antenna coil is received in contactless charging section 330.

Here, when contactless charging section 120 is located in a position where power can be supplied to contactless charging section 330, suppose contactless communication section 110 is located in a position where it is possible to carry out contactless communication with contactless communication section 410 of IC card section 400.

Contactless communication/charging control section 130 has communication state detection section 132, switching section 134 and switching control section 136.

Communication state detection section 132 is controlled by switching control section 136, monitors the state of communication between contactless communication section 110 and contactless communication section 410 on the IC card section 400 side, detects cases where contactless communication is not carried out, and outputs the detection results to switching control section 136.

Under the control of switching control section 136, switching section 134 can switch between contactless communication section 110 and contactless charging section 120 and carry out contactless communication or contactless charging for mobile phone 300 that has come close.

Switching control section 136 controls switching between contactless communication section 110 and contactless charging section 120 according to the result of state of contactless communication with contactless communication section 410 using contactless communication section 110 and the state of charging of mobile phone 300 using contactless charging section 120.

To be more specific, when contactless communication processing with contactless communication section 410 of IC card section 400 in mobile phone 300 that has come close fails, switching control section 136 switches the component to use from contactless communication section 110 to contactless charging section 120 via switching section 134. This causes contactless communication/charging control section 130 to stop contactless communication using contactless communication section 110 and carry out contactless charging processing via contactless charging section 120.

Furthermore, switching control section 136 detects that contactless charging has been performed for certain period of time via contactless charging section 120 using time counting section 138, and carries out contactless communication switching the component to use from contactless charging section 120 to contactless communication section 110 via switching section 134. This "certain period of time" is the time from when a command for switching from contactless communication section 110 to contactless charging section 120 is outputted to switching section 134, and is measured in time counting section 138.

Through such switching control section 136, reader/writer apparatus 100 performs contactless charging of mobile phone 300 after contactless communication fails, performs contactless charging a certain period of time and then stops contactless charging and carries out contactless communication.

Next, the operations of the apparatus configured as shown above will be explained using the flowchart shown in FIG. 2.

Figure 2:
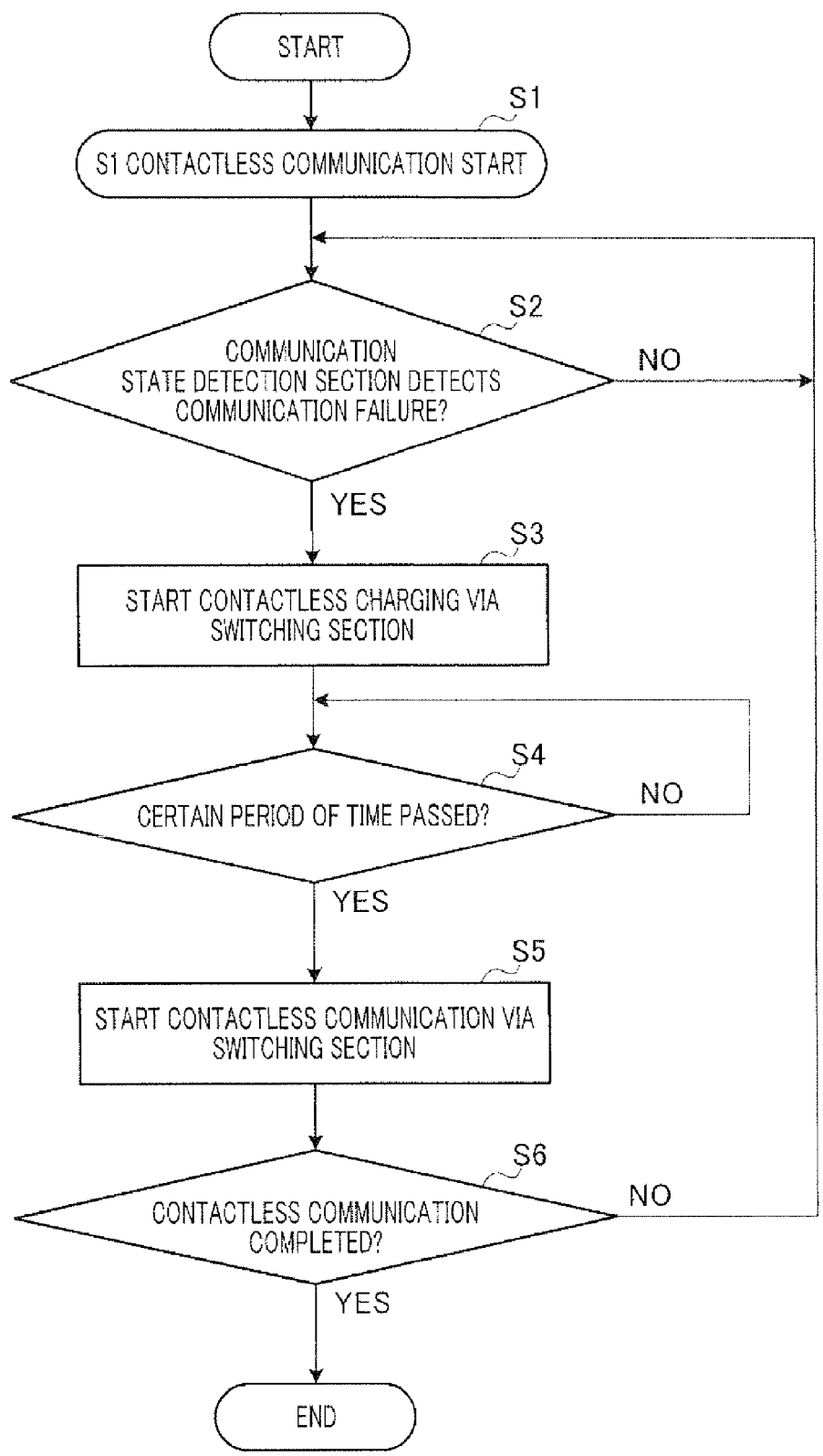
FIG. 2 is a flowchart illustrating charging operation of the reader/writer apparatus according to the embodiment of the present invention.

FIG. 2 is a flowchart illustrating a charging operation by reader/writer apparatus 100 according to the embodiment of the present invention.

In FIG. 2, suppose mobile phone 300 can start contactless communication with reader/writer apparatus 100 via IC card section 400 mounted in mobile phone 300, and has come up to a position where power can be supplied from reader/writer apparatus 100.

When mobile phone 300 mounting IC card section 400 which is the contactless type IC card comes close, in step S1, contactless communication section 110 in reader/writer apparatus 100 starts contactless communication with contactless communication section 410 of IC card section 400.

In this case, communication state detection section 132 monitors the state of communication state by contactless communication section 110 and decides whether or not communication has failed.

Next, in step S2, switching control section 136 in reader/writer apparatus 100 decides whether or not the detection result showing a communication failure has been inputted from communication state detection section 132, repeats step S2 when not inputted, or moves to step S3 when inputted.

In step S3, switching control section 136 switches contactless communication section 110 over to contactless charging section 120 via switching section 134, starts supplying power to contactless charging section 330 and moves to step S4.

That is, in step S3, contactless communication/charging control section 130 stops contactless communication section 110, and starts charging power storage section 310 of mobile phone 300 via contactless charging section 330 using contactless charging section 120.

In step S4, switching control section 136 during contactless charging decides whether or not a certain period of time has passed using time information from time counting section 138, repeats step S4 until the certain period of time elapses or moves to step S5 when the certain period of time has passed.

In step S5, switching control section 136 in reader/writer apparatus 100 switches contactless charging section 120 over to contactless communication section 110 via switching section 134, starts contactless communication and moves to step S6.

In step S6, contactless communication/charging control section 130 decides whether or not contactless communication via contactless communication section 110 has ended, that is, decides whether transmission and reception of information by contactless communication has ended, and returns to step S2 when not ended.

Thus, when carrying out contactless communication with mobile phone 300 mounting a contactless type IC card as IC card section 400, reader/writer apparatus 100 supplies power to contactless charging section 330 of mobile phone 300 when contactless communication is not possible.

That is, when it is not possible to carry out contactless communication with contactless communication section 410 of IC card section 400 in mobile phone 300 using contactless communication section 110, reader/writer apparatus 100 decides that the battery in power storage section 310 of mobile phone 300 is dead.

Reader/writer apparatus 100 then supplies power (to be more specific, electromagnetic wave) to contactless charging section 330 of mobile phone 300 using contactless charging section 120, and contactless charging section 330 that has received power outputs power to power storage section 310 via power control section 320. Time counting section 138 counts a certain period of time, and power storage section 310 is charged through this certain period of time of charging. The power supply from charged power storage section 310 allows IC card section 400 to operate.

After the certain period of time passes, reader/writer apparatus 100 starts contactless communication using contactless communication section 110 and carries out contactless communication with contactless communication section 410 of IC card section 400, which has been enabled to operate with power supplied from charged power storage section 310.

When power storage section 310 is assumed to be a capacitor, for example, the certain period of time which provides the reference for the decision by switching control section 136 during contact type charging, is shorter than when power storage section 310 is a secondary battery, and power charged in the capacitor is immediately supplied to IC card section 400.

This allows contactless charging section 120 to carryout contactless communication virtually in parallel with the charging processing.

Therefore, even when power in power storage section 310 of mobile phone 300 mounting IC card section 400 as the contactless type IC card has dies, that is, when the battery is dead or the power storage section dies during conversation using mobile phone 300, reader/writer apparatus 100 in communication system 200 can carry out contactless communication using IC card section 400.

Furthermore, reader/writer apparatus 100 never performs contactless communication processing and contactless charging processing in parallel with respect to mobile phone 300.

That is, reader/writer apparatus 100 of the present embodiment detects that contactless communication has failed, and, when there is a possibility that the battery of mobile phone 300 dies, retries contactless communication while performing charging.

Thus, unlike the prior art, it is possible to prevent both types of processing from being simultaneously performed on a portable terminal provided with a contactless IC function and thereby reduce power consumption.

Furthermore, in mobile phone 300 in communication system 200, power control section 320 charges power storage section 310 with power obtained from reader/writer apparatus 100 to and also directly sends power to the contactless IC.

Thus, even when charging power storage section 310 takes time, with regard to contactless communication, reader/writer apparatus 100 can immediately respond to contactless communication via contactless communication section 110 after a certain period of time passes.

Although a case has been described with respect to communication system 200 of the present embodiment where contactless communication section 410 and contactless charging section 330 in mobile phone 300 have different configurations, but the present invention is not limited to this, and it is possible to provide a common configuration as an information transmission section having functions for both contactless communication and contactless charging.

Also a case has been explained where contactless communication section 110 and contactless charging section 120 in reader/writer apparatus 100 have different configurations, but the present invention is not limited to this, and it is possible to provide a common configuration as an information transmission section having functions for both contactless communication and contactless charging.

In the present embodiment, reader/writer apparatus 100 stops contactless communication after detecting contactless communication fails via contactless communication section 110 and then starts contactless charging, but the present invention is not limited to this, and, after contactless communication fails, it is also possible to continue transmitting only a contactless communication request and perform contactless charging together with this request. However, when data is actually transmitted and received by contactless communication, suppose transmission and reception of data is carried out after stopping contactless charging.

The communication system according to the present invention is not limited to the above-described embodiment, but can be implemented modified in various ways.

Here, although a case has been described where the present invention is configured by hardware, the present invention may also be implemented by software. For example, an algorithm of contactless communication and contactless charging including the communication method according to the present invention may be written in a programming language, and this program may be stored in a memory, executed by an information processing section, and it is thereby possible to realize functions similar to those of the apparatus according to the present invention.

INDUSTRIAL APPLICABILITY

The reader/writer apparatus, communication system and contactless communication method according to the present invention provides an advantage of carrying out contactless communication with a contactless type IC card with reduced power consumption even when the battery of the mobile phone mounting the contact less type IC card without a built-in power source dies, and is useful as a mobile phone mounting a contactless type IC card and having a contactless IC function.

The invention claimed is:

1. A contactless type integrated circuit card reader/writer apparatus that carries out contactless communication with a contactless type integrated circuit card, the contactless type integrated circuit card not having a built-in power source and receiving a supply of power from a power storage section in a portable terminal in which the contactless type integrated circuit card is mounted, the contactless type integrated circuit card reader/writer apparatus comprising:
a contactless communication section that sends and receives information to and from the contactless type integrated circuit card by the contactless communication;
a contactless charging section that supplies the power to the power storage section in the portable terminal in a contactless manner;
a detection section that detects a state of the contactless communication; and
a control section that controls switching between the contactless communication section and the contactless charging section based on a detection result in the detection section to select between sending and receiving the information by the contactless communication, and supplying the power in the contactless manner,
wherein, when the contactless communication with the contactless type integrated circuit card using the contactless communication section is not possible, the control section controls the contactless charging section to charge the power storage section in the portable terminal and then controls the contactless communication section again to carry out the contactless communication.

2. The contactless type integrated circuit card reader/writer apparatus according to claim 1, wherein the power storage section is a secondary battery.

3. The contactless type integrated circuit card reader/writer apparatus according to claim 1, wherein the power storage section is a capacitor.

4. A communication system comprising a portable terminal mounting a contactless type integrated circuit card, and a contactless type integrated circuit card reader/writer apparatus that carries out contactless communication with the contactless type integrated circuit card, the contactless type integrated circuit card not having a built-in power source,
the portable terminal comprising:
a power storage section, which is a power source of the portable terminal and which supplies power to the contactless type integrated circuit card, and
the contactless type integrated circuit card reader/writer apparatus comprising:
a contactless communication section that sends and receives information to and from the contactless type integrated circuit card by the contactless communication;
a contactless charging section that supplies the power to the power storage section in the portable terminal in a contactless manner;
a detection section that detects a state of the contactless communication; and
a control section that controls switching between the contactless communication section and the contactless charging section based on a detection result in the detection section to select between sending and receiving the information by the contactless communication and supplying the power in the contactless manner,
wherein, when the contactless communication with the contactless type integrated circuit card using the contactless communication section is not possible, the control section controls the contactless charging section to charge the power storage section in the portable terminal and then controls the contactless communication section again to carry out the contactless communication.

5. The communication system according to claim 4, wherein the power storage section is a secondary battery.

6. The communication system according to claim 4, wherein the power storage section is a capacitor.

7. A contactless communication method for carrying out contactless communication with a contactless type integrated circuit card, the contactless type integrated circuit card not having a built-in power source and receiving a supply of power from a power storage section in a portable terminal in which the contactless type integrated circuit card is mounted, the contactless communication method comprising:
- sending and receiving information to and from the contactless type integrated circuit card by the contactless communication;
- supplying the power to the power storage section in the portable terminal in a contactless manner;
- detecting a state of the contactless communication; and
- controlling switching between the sending and receiving of the information by the contactless communication and the supplying of the power in the contactless manner based on a detection result of the state of the contactless communication, to select between the sending and receiving of the information by the contactless communication, and the supplying of the power in the contactless manner;
- wherein when the contactless communication with the contactless type integrated circuit is not possible, the method further comprises:
- performing the supplying of the power in the contactless manner to the power storage section in the portable terminal; and
- carrying out the contactless communication again after the performing of the supplying of the power in the contactless manner.

\* \* \* \* \*

UNITED STATES PATENT AND TRADEMARK OFFICE
CERTIFICATE OF CORRECTION

| | | |
|---|---|---|
| PATENT NO. | : 8,056,804 B2 | |
| APPLICATION NO. | : 12/514772 | |
| DATED | : November 15, 2011 | |
| INVENTOR(S) | : Jun Anzai et al. | |

It is certified that error appears in the above-identified patent and that said Letters Patent is hereby corrected as shown below:

Title Page, Item (75) Inventors, line 3, incorrectly reads:

"Tando, Kanagawa (JP)"

and should read:

"Tandou, Kanagawa (JP)"

Signed and Sealed this
Twenty-ninth Day of May, 2012

David J. Kappos
*Director of the United States Patent and Trademark Office*